2,890,724
CASING SPACER
Ted Kennedy, Jr., Ann Arbor, Mich.
Application December 19, 1955, Serial No. 554,072
11 Claims. (Cl. 138—65)

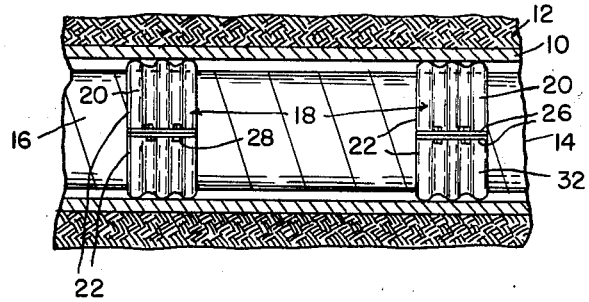
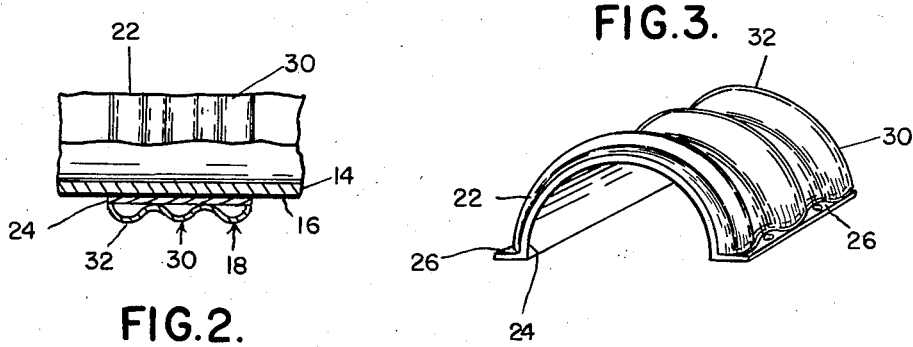
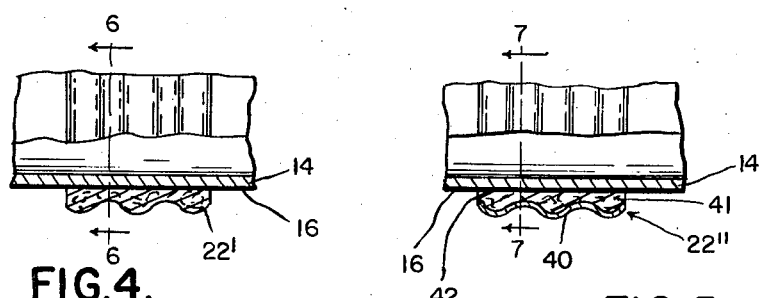
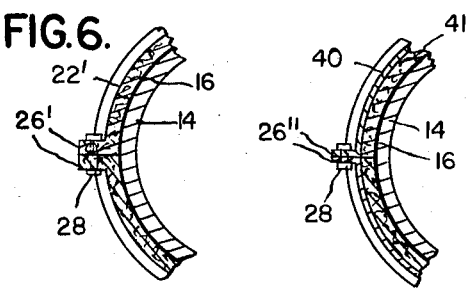
June 16, 1959     T. KENNEDY, JR     2,890,724
CASING SPACER
Filed Dec. 19, 1955
*INVENTOR.*
TED KENNEDY JR.
BY
ATTORNEYS

# United States Patent Office 2,890,724
Patented June 16, 1959

This invention relates to underground pipes or conduits and refers more particularly to a casing spacer to be used for concentrically locating the underground pipes or conduits within casings.

When an underground pipeline crosses a road, it is customary to dig a tunnel under the road and to place within the tunnel an open ended tubular casing of a size to accommodate the pipeline. Sections of pipe are then slid through the casing and then assembled into the line.

Underground pipelines are customarily covered with a corrosion resistant coating and wrapper of one kind or another. It has been found that the act of sliding a section of pipe into a tubular casing frequently results in breaking through the coating and wrapping system. Obviously, for a coating and/or wrapper to protect a pipe against the actions of soil stress, bacteria, and the like, it is necessary to completely cover all portions of the pipe surface and, therefore, it is extremely important to avoid scraping the coating or wrapper from any portion of the pipe surface.

One object of the present invention is to provide a casing spacer for supporting a length of pipe in spaced relation to the casing.

Another object of the invention is to provide a casing spacer which will spread along the bottom of the casing such heavy lubricant as may be applied to the bottom of the casing in front of the casing spacer for the purpose of reducing friction between the spacer and the casing bottom.

Another object of the invention is to provide a casing spacer which will enable sliding the length of pipe into the casing with minimum resistance to sliding movement.

Still another object of the invention is to provide a casing spacer which is composed of a relatively few simple parts, which is inexpensive to manufacture and which may be readily assembled on the pipe.

Other objects of the invention will become apparent as the following description proceeds, especially when considered in conjunction with the accompanying drawing, wherein:

Figure 1 is a longitudinal sectional view of a tubular casing having a length of pipe supported therein in spaced relation to the casing by means of casing spacers constructed in accordance with the present invention.

Figure 2 is a fragmentary side elevational view of one of the casing spacers shown partly in section.

Figure 3 is a perspective view of one half of the casing spacer.

Figure 4 is a view similar to Figure 2 but showing a modification.

Figure 5 shows a further modification.

Figures 6 and 7 are sections taken on the lines 6—6 and 7—7 respectively.

Referring now more particularly to the drawing, the numeral 10 indicates an open-ended tubular casing which may be formed of any suitable material. Ordinarily, the casing 10 is formed of metal. The casing is shown disposed underground, the ground being indicated at 12. Casings of this kind are usually provided under a road where it is necessary to tunnel. In other places, a trench need merely be dug and the pipeline laid in it, whereupon the trench is filled to cover the pipeline. However, when a road is encountered, rather than dig a trench across the road and thereby destroy a large section of the road at some considerable expense, a tunnel is formed into which the tubular casing 10 is inserted.

The section of pipe within the casing 10 is indicated at 14. The outside diameter of the pipe 14 is considerably less than the inside diameter of the casing to enable the pipe to be supported in spaced relation therewithin. The pipe is covered with a spirally round length of tape 16, the adjacent convolutions of which overlie one another to provide a continuous barrier for excluding water vapor, bacteria, and other harmful elements in the soil from reaching the outer surface of the pipe. If desired, the pipe may be initially coated with any suitable corrosion resistant specification and the tape 16 wrapped over it.

In any event, it will be appreciated that when the pipe section 14 is slid endwise into the casing, there is the danger that the pipe coating and/or wrapper 16 may be broken, or otherwise impaired unless some means is provided for supporting the section of pipe in spaced relation to the casing.

As a means for supporting the pipe 14 in spaced relation within the casing, the casing spacers 18 are provided. Two or more such spacers are located along the length of pipe to be threaded into the casing.

The casing spacers are identical and each comprises a ring, or sleeve 20 which encircles and tightly embraces the wrapped pipe. Each sleeve is composed of two half sections 22 which are of identical construction. Referring to Figures 2 and 3, it will be seen that the half sections each comprise a relatively thin half-cylinder sleeve portion 24 which has the radially outwardly extending flanges 26 at the opposite ends. The sleeve portions 24 may be of any desired metal construction. Suitable means such as nut and bolt assemblies 28 extend through the flanges 26 of the complementary half sections 22 to secure the same together snugly about the pipe.

The sleeve sections 22 have corrugated or contoured sheets 30 secured to their outer surfaces by any suitable means, such as welding, for example. These sheets of relatively rigid metal construction are corrugated as seen particularly in Figure 2 to provide the axially spaced circumferentially extending radially outwardly projecting ribs 32. These ribs are concentric with the sleeve and the ribs of one section respectively extend in continuation with the ribs of the other section, being separated only by the flanges 26.

The casing spacers 18 will thus be seen to engage the casing 10 by means of the rib formations 32 and thereby support the pipe section 14 in spaced relation within the casing.

It is sometimes preferred to grease the inner surface of the casing along the bottom to enable the spacers to slide along the casing without undue resistance. By providing the circumferentially extending axially spaced ribs 32 on each casing spacer, the casing spacers are enabled to slide over the greased surface very easily. Grease tends to become entrapped ahead of and in the roots between the ribs to provide a film of lubricant between the ribs and the bottom of the casing.

Figure 4 illustrates a casing spacer in which the sleeve sections 22' are of one piece construction and formed of fiberglass reinforced plastic. A spacer thus formed of fiberglass, which is an electrically insulating material, is desirable in that it electrically insulates the pipe from the metal casing 10. Otherwise, the casing spacer of Figure 4 is exactly like that of Figure 2, that is, it includes a pair of sleeve sections 22' which are of identical hollow semi-cylindrical construction provided with integral radially outwardly extending flanges 26' at the ends which are secured to the adjacent flanges of the cooperating sleeve section by suitable means such as the assemblies 28.

Figure 5 illustrates a casing spacer in which the hollow half-cylinder sleeve sections 22" are each formed of corrugated metal or plastic sheet 40, the corrugations extending circumferentially in axially spaced relation. Each sheet 40 is, of course, provided with radially outwardly extending flanges 26" at the ends which are secured to the flanges of the other sleeve section by suitable means such as the assemblies 28. Each sleeve section has secured to the radially inner side a sheet 41 which is coextensive with sheet 40 and completely fills the corrugations. Sheet 41 is formed of any suitable dielectric material, fiberglass reinforced plastic for example, and has a smooth cylindrical inner surface 42 to bear upon the coating and wrapper protecting the pipe.

What I claim as my invention is:

1. A spacer for supporting a pipe in a tubular casing in spaced relation thereto, comprising a sleeve adapted to encircle the pipe in generally coaxial relation therewith, said sleeve having on its radially outer surface a plurality of axially spaced circumferentially extending outwardly projecting ribs engageable with the casing to support the pipe in spaced relation thereto, the sides of each rib being convexly rounded at the radially outer extremity.

2. A spacer as defined in claim 1 in which said ribs are concentric with said sleeve.

3. A spacer for supporting a pipe in a tubular casing in spaced relation thereto, comprising a sleeve adapted to encircle the pipe in generally coaxial relation therewith, said sleeve comprising arcuate sleeve sections having means for releasably connecting said sections together to complete said sleeve, said sleeve sections having on their radially outer surfaces a plurality of axially spaced, radially outwardly projecting ribs engageable with the casing to support the pipe in spaced relation thereto, said ribs being concentric with said sleeve and the ribs of one section respectively extending in continuation of the ribs of another section, the sides of each rib being convexly rounded at the radially outer extremity.

4. A spacer for supporting a pipe in a tubular casing in spaced relation thereto, comprising a sleeve adapted to encircle the pipe in generally coaxial relation therewith, said sleeve comprising arcuate sleeve sections having means for releasably connecting said sections together to complete said sleeve, said sleeve sections having sheets secured to their radially outer surfaces, said sheets being corrugated to provide a plurality of axially spaced radially outwardly projecting ribs engageable with the casing to support the pipe in spaced relation thereto, said ribs being concentric with said sleeve and the ribs of one section respectively extending in continuation of the ribs of another section.

5. A spacer for supporting a pipe in a tubular casing in spaced relation thereto, comprising a sleeve adapted to encircle the pipe in generally coaxial relation therewith, said sleeve comprising arcuate sleeve sections having means for releasably connecting said sections together to complete said sleeve, said sleeve sections each comprising arcuate sheets corrugated to provide a plurality of axially spaced radially outwardly projecting ribs engageable with the casing to support the pipe in spaced relation thereto, and a dielectric material secured to the radially inner surface of each sheet completely filling the corrugations and having a smooth cylindrical inner surface for bearing engagement with the pipe.

6. A spacer as defined in claim 5 in which the sides of each rib are convexly rounded at the radially outer extremity.

7. A spacer for supporting a pipe in a tubular casing in spaced relation thereto, comprising a sleeve adapted to encircle the pipe, said sleeve having on its radially outer surface a plurality of axially spaced radially outwardly projecting ribs extending circumferentially thereabout and engageable with the casing to support the pipe in spaced relation thereto, the axially remote sides of the ribs at opposite ends of said plurality of ribs being convexly rounded at the radially outer extremity.

8. A spacer as defined in claim 7 in which the axially adjacent sides of said ribs are also convexly rounded at the radially outer extremity.

9. A spacer for supporting a pipe in a tubular casing in spaced relation thereto, comprising a sleeve adapted to encircle the pipe in generally coaxial relation therewith, said sleeve comprising an annular sheet member corrugated to provide a plurality of axially spaced radially outwardly projecting ribs engageable with the casing to support the pipe in spaced relation thereto, and a dielectric material secured to the radially inner surface of said sheet member completely filling said corrugations and for bearing engagement with the pipe, the axially remote sides of the ribs at opposite ends of said plurality of ribs being convexly rounded at the radially outer extremity.

10. A spacer for supporting a pipe in a tubular casing in spaced relation thereto, comprising a sleeve adapted to encircle the pipe in generally coaxial relation therewith, said sleeve having on its radially outer surface a plurality of axially spaced circumferentially extending radially outwardly projecting ribs engageable with the casing to support the pipe in spaced relation thereto, the corresponding side of each rib being convexly rounded at the radially outer extremity thereof.

11. A spacer for supporting a pipe in a tubular casing in spaced relation thereto, comprising a sleeve adapted to encircle the pipe in generally coaxial relation therewith, said sleeve having a circumferentially extending annular peripheral portion engageable with the casing to support the pipe in spaced relation thereto, said peripheral portion being convexly rounded at its radially outer extremity to provide an annular spreader for lubricant between the casing and sleeve as the pipe with said sleeve encircling it is slid axially into the casing in one direction.

References Cited in the file of this patent

UNITED STATES PATENTS

| | | |
|---|---|---|
| 1,368,013 | Babcock | Feb. 8, 1921 |
| 2,551,867 | Bond | May 8, 1951 |
| 2,603,347 | Fish | July 15, 1952 |
| 2,664,112 | Isenberg | Dec. 29, 1953 |

FOREIGN PATENTS

| | | |
|---|---|---|
| 683,808 | Germany | Nov. 16, 1939 |